United States Patent Office 3,816,560
Patented June 11, 1974

---

3,816,560
POLYMERIZABLE COMPOSITIONS AND METHOD OF FORMING PRODUCTS THEREOF
Gilbert Chretien, Chauny, Philippe Girard, Autreville, Jean-Marc Lamy, Villequier-Aumont, and Christophe Menard, Sinceny, France, assignors to Rhone-Progil, Paris, France
No Drawing. Filed Oct. 5, 1972, Ser. No. 295,341
Claims priority, application France, Oct. 6, 1971, 7135951
Int. Cl. C08f 1/60, 21/00, 21/02
U.S. Cl. 260—861                                   8 Claims

ABSTRACT OF THE DISCLOSURE

A polymerizable composition formulated of an unsaturated polyester, at least one monomer having an ethylenic double bond and β-chloropropionyl peroxide and the method for producing shaped products thereof by forming material to the desired shape and allowing the shaped material to polymerize.

---

This invention relates to polyester resins and monomers which are copolymerizable over a wide temperature range and it relates more particularly to catalyst systems employed therewith.

Unsaturated polyesters are generally copolymerized with vinylic monomers in the presence of catalysts, such as benzoyl peroxide or a ketone peroxide. These catalysts must be introduced into the resin before polymerization and may necessitate the addition of a compound which modifies the action of the catalyst, depending upon the operating temperature.

The applicants have obtained and it is an object of this invention to provide new compositions comprising a catalyst for the fixation of at least one vinylic or allylic monomer onto unsaturated alkyd chains, such compounds being capable of being preserved for a long time prior to use, at a temperature close to ambient temperature, while the speed of polymerization at moderate temperature, in the absence of an accelerator, is fairly low, thereby to allow manufacturing operations which are otherwise difficult to carry out with conventional catalysts.

In accordance with one aspect of the invention, there is provided a polymerizable composition which comprises an unsaturated polyester, at least one monomer having an ethylenic double bond, and β-chloropropionyl peroxide.

The catalyst may be dissolved, during its preparation, in an inert solvent, such as liquid phthalate ester, and preferably dimethyl phthalate. The content of the catalyst, expressed as weight of active oxygen in the solution, is selected to be generally within the range of 2% to 6%. The percentage by weight, expressed as active oxygen in the peroxide catalyst in relation to the resin, is preferably within the range of 0.05% to 0.2%.

In addition to polyester, usually obtained by condensation of at least one polycarboxylic acid or anhydride and at least one polyol or an internal oxide of an ether (=epoxy function) and containing ethylenic double bonds, at least one vinylic or allylic monomer, and a catalyst with a minimum amount of solvent, the composition can contain accelerators and other ingredients, such as colorants or fillers generally used with such resins. The compounds, of which at least one part must be unsaturated, giving polyester chains by polycondensation, as well as the vinylic or allylic monomers, ensuring their reticulation, can be selected from those mentioned in "Polyester Resins" (Lawrence), pp. 13–40, published in 1960 by Reinhold Publishing Corporation, New York. The other possible ingredients of the resins, except the catalysts, are also mentioned in this work.

The compositions obtained can be stored for 24 hours at 25° C. Analogous compositions, with methyl isobutyl-ketone peroxide which is one of the most popular of the conventional catalysts, cannot be stored more than a few hours under these conditions.

Some such compositions can be used for shaping by pressing at about 120° C. without an accelerator.

They can also be used at ambient temperature for the manufacture of stratified materials, for example by incorporating, shortly before (a few minutes) use, tertiary amines, for example dimethyl aniline (0.05% by weight) generally used in conventional techniques for the manufacture of stratified materials.

Use at a low temperature requires the addition of an accelerator, such as an alkoylaromatic tertiary amine, at the time of use.

In order to further explain the action of these catalysts, the following table shows quantitively the results of this action. Table I gives the results obtained for the resin in a glass vessel.

TABLE I

| Resin | Accelerator (percent by weight on the resin) | Percentage by weight of catalyst in active O, percent | Temperature, ° C. | Gelling time (min.) |
|---|---|---|---|---|
| Poly-propylene glycol maleophthalate with 37% of styrene by weight on the resin (viscosity at 25° C.: 4 poises). | Dimethylaniline, 0.05%. | 0.076 | 25 | 25 |
| Id. | do | 0.076 | 50 | 10 |
| Id. | 0 | 0.076 | 70 | 20 |

The following examples, given by way of illustration but not by way of limitation, illustrate the application of the compositions of the invention.

EXAMPLE 1

Two superposed glass fiber mats, each weighing 450 g./m.², are impregnated by a roller at 25° C. with a resin of polypropylene glycol maleophthalate containing 30% by weight of styrene, catalyzed by β-chloropropionyl peroxide. The proportion by weight of the resin in the impregnated mat is 70%. The accelerator is dimethylaniline. The other operating conditions and the results are given in the following Table II.

TABLE II

| Percentage by weight of active oxygen | Percentage by weight of accelerator 10% dimethylaniline | Gelling time, min. | Barcol hardness after the time indicated (in brackets) |
|---|---|---|---|
| 0.076 | 0.8 | 22 | 45 (after 48 hr.). |
| 0.1 | 0.7 | 27 | 40 (after 48 hr.). |
| 0.076 | 1 | 15 | 50 (after 24 hr.). |

EXAMPLE 2

This example describes the use of a composition embodying the features of this invention in the manufacture of serving trays reinforced with glass fiber.

In one half of a chrome steel mold for preparing trays having a length of 43 cm., a width of 3 cm. and a thickness of 0.3 cm., an inclined border of 1 cm., two superposed glass fiber mats each weighing 450 g. per square meter and cut to the dimension of the mold are inserted. Then there is added 186 g. of a resin composition catalyzed by β-chloropropionyl peroxide containing 72% by weight of poly-propylene glycol maleophthalate and 28% of styrene (the mixture has a viscosity of 30 poises at 25° C.), to which has been added a quantity of β-chloropropionyl peroxide such that the content by weight of active oxygen in the mixture is 0.15%.

A die having a corresponding shape is applied to one half of the mold at a pressure of 43 kg./cm.$^2$. The mold is then held at 120° C. for 4 and ½ minutes.

The trays obtained, after cooling for 15 minutes, have a Barcol hardness of 40.

It will be understood that changes may be made in the details of formulation and operation without departing from the spirit of the invention, especially as defined in the following claims.

We claim:

1. A polymerizable composition comprising an essentially linear unsaturated polyester of a polycarboxylic acid or its anhydride with a polyol or a monoepoxide, at least one monomer having an ethylenic double bond, and β-chloropropionyl peroxide.

2. A composition as claimed in claim 1 in which the amount of β-chloropropionyl peroxide present is within the range of 0.05% to 0.2% of the total weight of the polyester and monomer, measured as active oxygen.

3. A composition as claimed in claim 1 in which the polyester is prepared by co-condensation of propylene glycol, maleic acid and phthalic acid.

4. A composition as claimed in claim 1 in which the monomer is styrene.

5. A composition as claimed in claim 1 in which the β-chloropropionyl peroxide is added to the composition as a solution in liquid phthalate ester.

6. A composition as claimed in claim 1 which contains dimethylaniline.

7. A composition as claimed in claim 1 which contains at least one accelerator.

8. A composition as claimed in claim 7 in which the accelerator is a mixed alkyl aryl tertiary amine.

References Cited

UNITED STATES PATENTS 2,554,567  5/1951  Gerhart et al. _____ 260—861 X

OTHER REFERENCES

"Polyesters and Their Applications," Bjorksten, pp. 48–50, Reinhold, 1956.

Chemical Abstracts, *68*, 13576w (1968), and *68*, 13577x (1968).

WILLIAM H. SHORT, Primary Examiner

E. A. NIELSEN, Assistant Examiner

U.S. Cl. X.R.

260—40 R, 861, 864